(12) United States Patent
Sato et al.

(10) Patent No.: US 12,243,244 B2
(45) Date of Patent: Mar. 4, 2025

(54) IMAGE PROCESSING APPARATUS, IMAGE PROCESSING METHOD, LEARNING APPARATUS, LEARNING METHOD AND RECORDING MEDIUM

(71) Applicant: NEC Corporation, Tokyo (JP)

(72) Inventors: Hideaki Sato, Tokyo (JP); Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 456 days.

(21) Appl. No.: 17/785,129

(22) PCT Filed: Dec. 27, 2019

(86) PCT No.: PCT/JP2019/051515
§ 371 (c)(1),
(2) Date: Jun. 14, 2022

(87) PCT Pub. No.: WO2021/131039
PCT Pub. Date: Jul. 1, 2021

(65) Prior Publication Data
US 2023/0011679 A1    Jan. 12, 2023

(51) Int. Cl.
*G06T 7/246* (2017.01)
*G06T 7/215* (2017.01)
(Continued)

(52) U.S. Cl.
CPC .............. *G06T 7/248* (2017.01); *G06T 7/215* (2017.01); *G06T 7/251* (2017.01); *G06T 7/60* (2013.01); *G06T 2207/20081* (2013.01)

(58) Field of Classification Search
CPC . G06T 2207/10016; G06T 2207/20076; G06T 2207/20081; G06T 2207/20084;
(Continued)

(56) References Cited

U.S. PATENT DOCUMENTS 7,027,621 B1 *  4/2006  Prokoski .............. G06V 40/165
                                                    340/576
2009/0119079 A1 *  5/2009  Shimizu .................. G06F 30/23
                                                    73/167

(Continued)

FOREIGN PATENT DOCUMENTS

JP    2002-157599 A      5/2002
JP    WO-3007836 A1 *   7/2002
(Continued)

OTHER PUBLICATIONS

International Search Report for PCT Application No. PCT/JP2019/051515, mailed on Feb. 25, 2020.

*Primary Examiner* — Asghar H Bilgrami
(74) *Attorney, Agent, or Firm* — Sughrue Mion, PLLC

(57) ABSTRACT

In an image processing apparatus, a foreground extraction unit extracts each foreground from input images, and generates a foreground extraction result. A movement trajectory feature extraction unit tracks each foreground based on the foreground extraction result, and extracts a movement trajectory feature of the foreground. The area variation feature extraction unit extracts an area variation feature representing a temporal area variation of each foreground. A foreground center estimation unit estimates a center of each foreground using the movement trajectory feature and the area variation feature.

12 Claims, 10 Drawing Sheets

(51) Int. Cl.
*G06T 7/254* (2017.01)
*G06T 7/60* (2017.01)

(58) Field of Classification Search
CPC ........... G06T 2207/30241; G06T 7/215; G06T 7/248; G06T 7/251; G06T 7/254; G06T 7/60
See application file for complete search history.

(56) References Cited

U.S. PATENT DOCUMENTS

| | | | |
|---|---|---|---|
| 2009/0169067 A1* | 7/2009 | Chang | G06V 40/173 |
| | | | 382/118 |
| 2016/0086342 A1* | 3/2016 | Yamaji | G06T 11/60 |
| | | | 382/103 |
| 2022/0392212 A1* | 12/2022 | Sato | G06T 7/11 |

FOREIGN PATENT DOCUMENTS

| | | | | |
|---|---|---|---|---|
| JP | 2012-203439 A | | 10/2012 | |
| JP | 2013065118 A | * | 4/2013 | ......... G06K 9/00228 |
| WO | 2009/102001 A1 | | 8/2009 | |

* cited by examiner

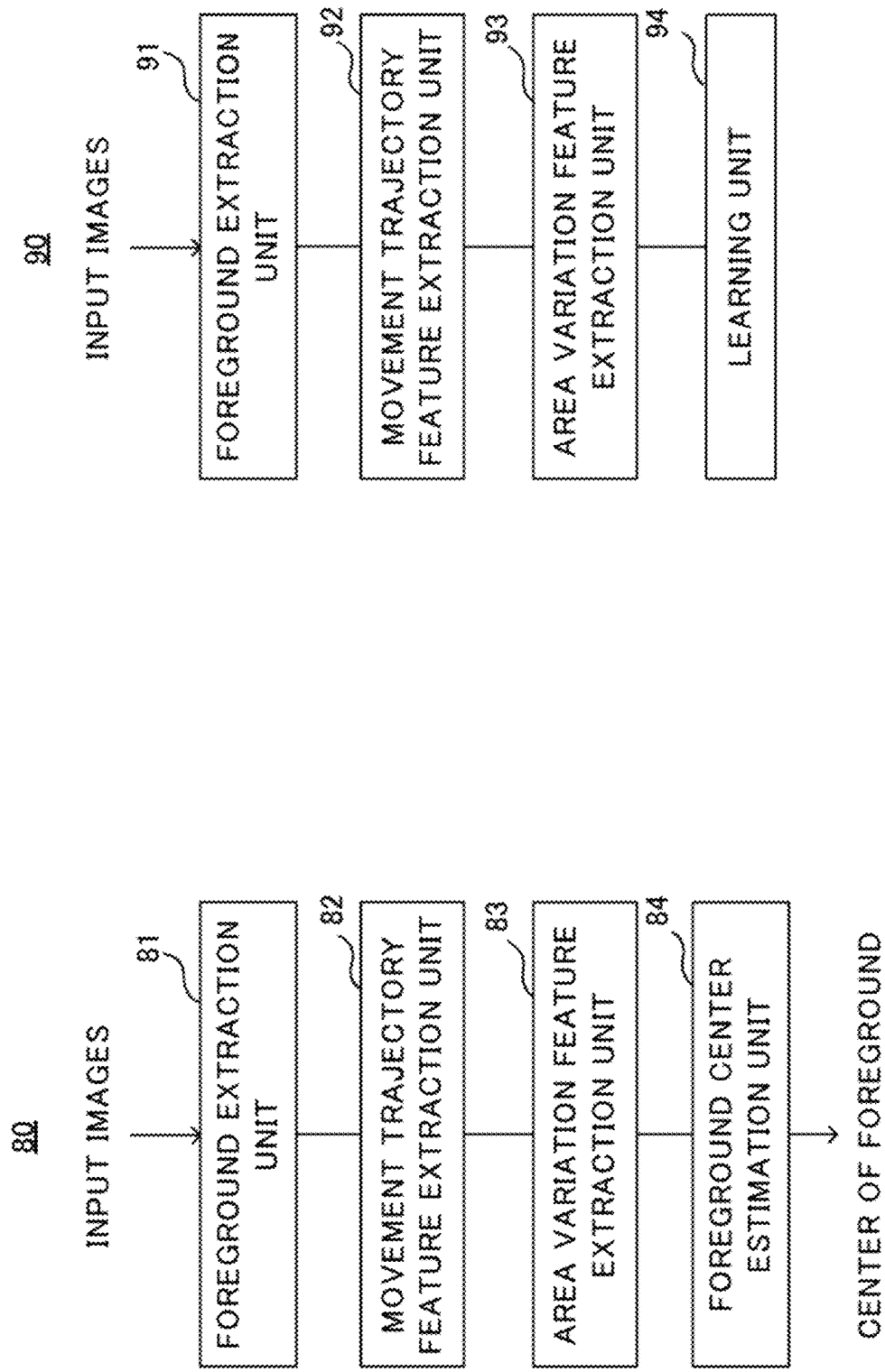

IMAGE PROCESSING APPARATUS, IMAGE PROCESSING METHOD, LEARNING APPARATUS, LEARNING METHOD AND RECORDING MEDIUM

This application is a National Stage Entry of PCT/JP2019/051515 filed on Dec. 27, 2019, the contents of all of which are incorporated herein by reference, in their entirety.

TECHNICAL FIELD

The present disclosure relates to a technique for recognizing an object contained in an image.

BACKGROUND ART

In recent years, drones have been utilized for various applications. In a case where the drones have become popularly used, it is considered that an air traffic control of the drones will be necessary. For example, it is necessary to monitor surroundings of the drones to be managed using images taken by cameras installed on the ground. Specifically, in an aviation control work of drones, it is necessary to detect small moving objects based on captured images, to identify uncontrollable objects such as birds and drones other than managed drones, and to automatically perform collision avoidance by immediately controlling the drones to be managed. Accordingly, it is necessary to identify a type of a flying object in a vicinity of the drone to be managed.

Patent Documents 1 and 2 describe a technique for identifying or recognizing an object based on a movement trajectory of the object in a captured image.

PRECEDING TECHNICAL REFERENCES

Patent Document

International Publication Pamphlet No. WO2009/102001
Japanese Laid-open Patent Publication No. 2002-157599

SUMMARY

Problem to be Solved by the Invention

In a case where an object to be recognized is a small moving object such as a bird, it is difficult to accurately estimate a center position of the moving object. In a method for recognizing or identifying an object based on a movement trajectory of the object as in the above-described patent documents, in a case where an estimation of the center position of the object becomes unstable or inaccurate, it is difficult to identify the object.

It is one object of the present disclosure to accurately estimate the center position of the moving object included in the image.

Means for Solving the Problem

According to an example aspect of the present disclosure, there is provided an image processing apparatus including:
a foreground extraction unit configured to extract each foreground from input images, and generate a foreground extraction result;
a movement trajectory feature extraction unit configured to track each foreground based on the foreground extraction result, and extract a movement trajectory feature of each foreground;
an area variation feature extraction unit configured to extract an area variation feature representing a temporal area variation of each foreground; and
a foreground center estimation unit configured to estimate a center of each foreground using the movement trajectory feature and the area variation feature of the foreground.

According to another example aspect of the present disclosure, there is provided an image processing method including:
extracting each foreground from input images, and generating a foreground extraction result;
tracking each foreground based on the foreground extraction result, and extracting a movement trajectory feature of each foreground;
extracting an area variation feature representing a temporal area variation of each foreground; and
estimating a center of each foreground using the movement trajectory feature and the area variation feature of the foreground.

According to still another example aspect of the present disclosure, there is provided a recording medium storing a program, the program causing a computer to perform a process including:
extracting each foreground from input images, and generating a foreground extraction result;
tracking each foreground based on the foreground extraction result, and extracting a movement trajectory feature of each foreground;
extracting an area variation feature representing a temporal area variation of each foreground; and
estimating a center of each foreground using the movement trajectory feature and the area variation feature of the foreground.

According to a further example aspect of the present disclosure, there is provided a learning apparatus including:
a foreground extraction unit configured to extract each foreground from input images, and generate a foreground extraction result;
a movement trajectory feature extraction unit configured to track each foreground based on the foreground extraction result, and extract a movement trajectory feature of each foreground;
an area variation feature extraction unit configured to extract an area variation feature representing a temporal area variation of each foreground; and
a learning unit configured to train a foreground center estimation model that estimates a center of each foreground using the movement trajectory feature and the area variation feature.

According to still another example aspect of the present disclosure, there is provided a learning method including:
extracting each foreground from input images, and generate a foreground extraction result;
tracking each foreground based on the foreground extraction result, and extracting a movement trajectory feature of each foreground;
extracting an area variation feature representing a temporal area variation of each foreground; and
training a foreground center estimation model that estimates a center of each foreground using the movement trajectory feature and the area variation feature.

According to yet further example aspect of the present disclosure, there is provided a recording medium storing a program, the program causing a computer to perform a process including:

extracting each foreground from input images, and generate a foreground extraction result;

tracking each foreground based on the foreground extraction result, and extracting a movement trajectory feature of each foreground;

extracting an area variation feature representing a temporal area variation of each foreground; and training a foreground center estimation model that estimates a center of each foreground using the movement trajectory feature and the area variation feature.

Effect of the Invention

According to the present disclosure, it is possible to accurately estimate a center position of a moving object included in an image.

BRIEF DESCRIPTION OF THE DRAWINGS

FIG. 10A and FIG. 10B illustrate configurations of an image processing apparatus and a learning apparatus according to a second example embodiment.

EXAMPLE EMBODIMENTS

In the following, example embodiments will be described with reference to the accompanying drawings.

In a case of recognizing a moving object in a captured image, when a size of the moving object is small, an error is likely to occur in an estimation of a center position of the moving object in the captured image. In the following example embodiments, the moving object in a captured image is extracted as a foreground, and a center position of the foreground is accurately estimated using a feature of a movement trajectory of the foreground and a feature of an area.

First Example Embodiment

[Hardware Configuration]

Figure 1:
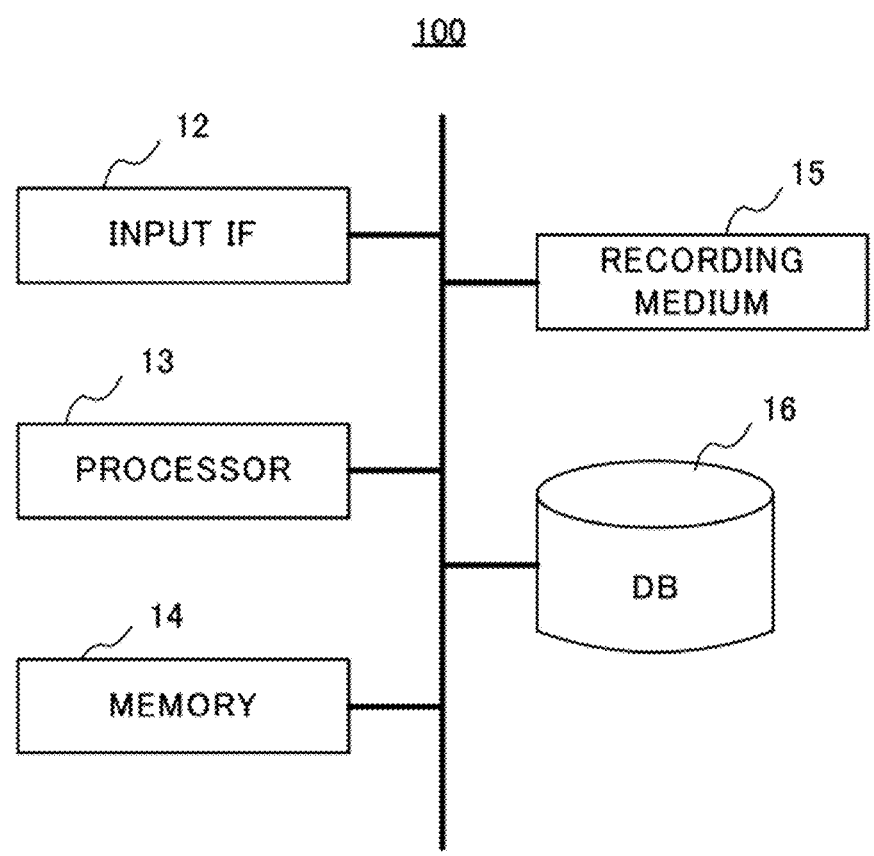
FIG. 1 illustrates a hardware configuration of an image processing apparatus according to a first example embodiment.

FIG. 1 is a block diagram illustrating a hardware configuration of an image processing apparatus according to a first example embodiment. As illustrated, the image processing apparatus 100 includes an input IF (InterFace) 12, a processor 13, a memory 14, a recording medium 15, and a database (DB) 16.

The input IF 12 acquires an input image to be processed by the image processing apparatus 100. For example, images capturing moving objects flying through the sky are input through the input IF 12 by cameras installed on the ground. The processor 13 is a computer such as a CPU (Central Processing Unit) and controls the entire image processing apparatus 100 by executing a program prepared in advance. Specifically, the processor 13 executes a learning process and a center estimation process to be described later.

The memory 14 is formed by a ROM (Read Only Memory), a RAM (Random Access Memory), or the like. The memory 14 stores various programs to be executed by the processor 13. The memory 14 is also used as a working memory during executions of various processes by the processor 13.

The recording medium 15 is a non-volatile and non-transitory recording medium such as a disk-shaped recording medium or a semiconductor memory, and is formed to be detachable from the image processing apparatus 100. The recording medium 15 stores various programs executed by the processor 13. When the image processing apparatus 100 executes various kinds of processes, programs recorded on the recording medium 15 are loaded into the memory 14 and executed by the processor 13.

The database 16 stores data input from an external apparatus. Specifically, input images to be processed by the image processing apparatus 100 are stored. In addition to the above, the image processing apparatus 100 may include an input device such as a keyboard or a mouse or a display unit for allowing a user to perform instructions or inputs.

(Functional Configuration)

Figure 2:
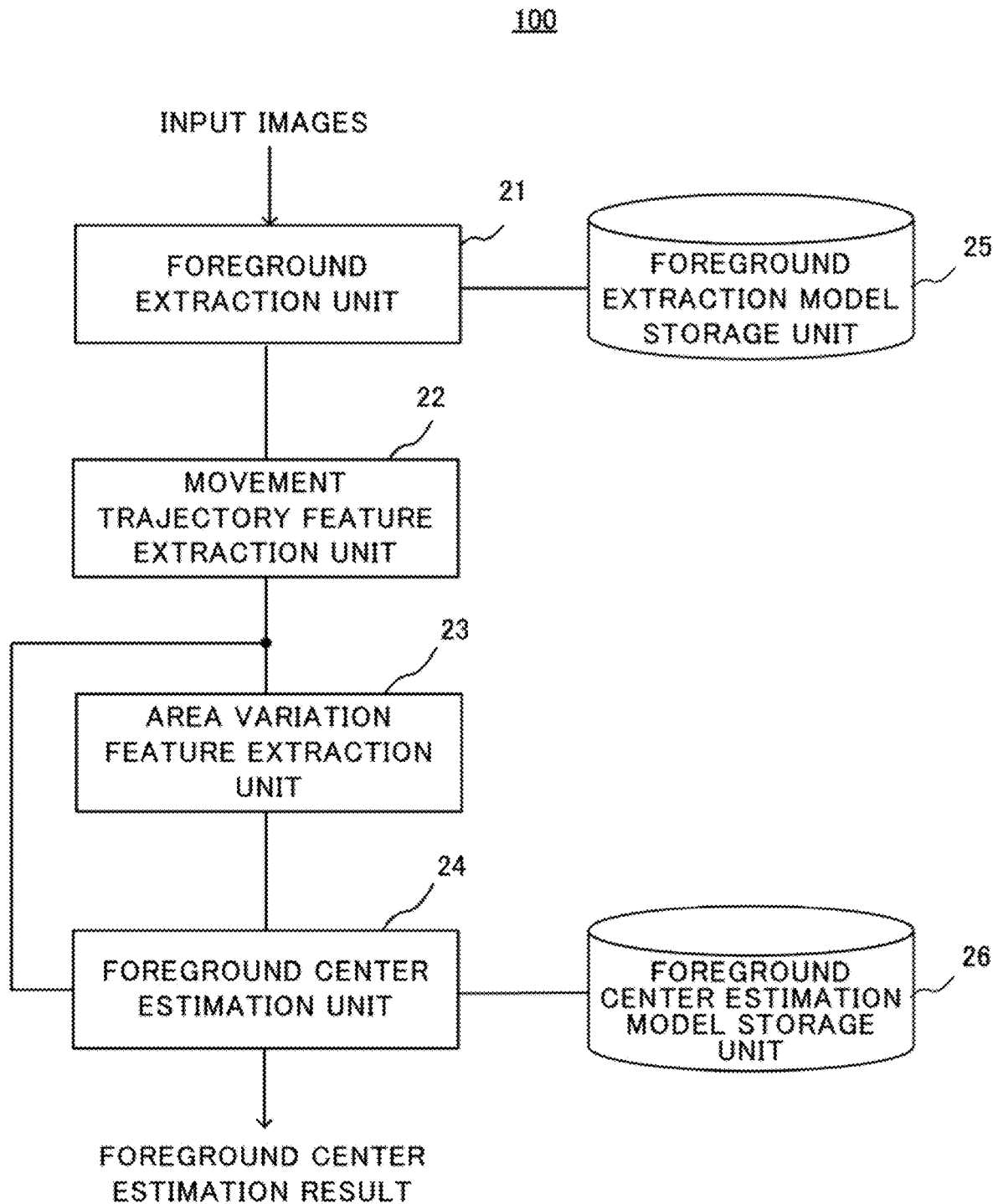
FIG. 2 illustrates a functional configuration of the image processing apparatus according to the first example embodiment.

FIG. 2 is a block diagram illustrating a functional configuration of the image processing apparatus 100 according to the first example embodiment. As illustrated, the image processing apparatus 100 includes a foreground extraction unit 21, a movement trajectory feature extraction unit 22, an area variation feature extraction unit 23, a foreground center estimation unit 24, a foreground extraction model storage unit 25, and a foreground center estimation model storage unit 26.

The foreground extraction unit 21 extracts each foreground from input images. Each foreground is a portion other than a background in the input images, and is an area corresponding to a moving object to be identified. The foreground extraction model storage unit 25 stores a plurality of foreground extraction models for extracting foregrounds from the input images. For instance, the foreground extraction model is regarded as a model using a background subtraction technique. The foreground extraction unit 21 acquires a foreground extraction model from the foreground extraction model storage unit 25, and extracts each foreground from the input images.

Figure 3:
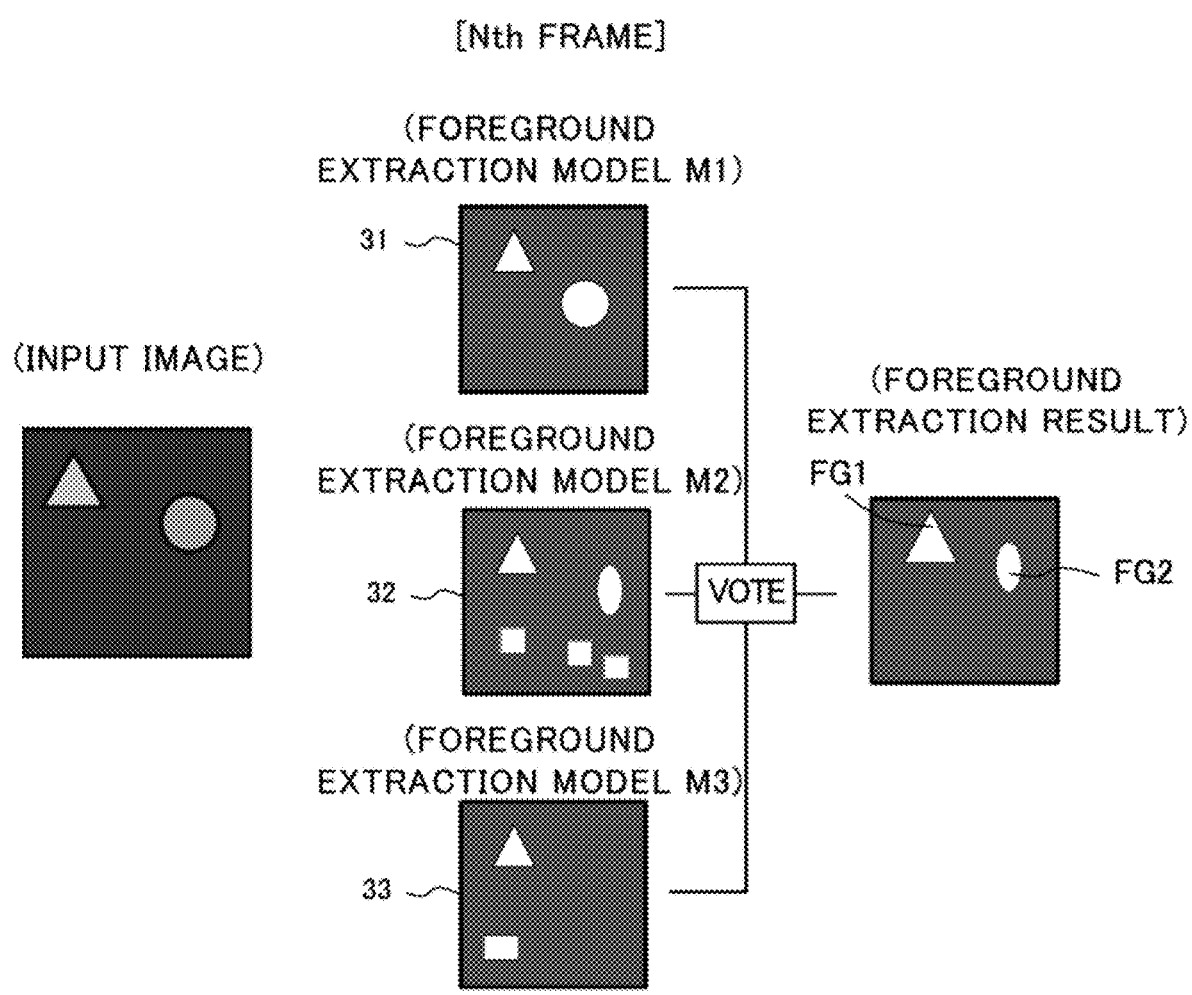
FIG. 3 is a diagram for explaining an example of a foreground extraction method.

FIG. 3 is a diagram illustrating an example of a foreground extraction method. The foreground extraction unit 21 obtains a foreground extraction result by applying a plurality of foreground extraction models with respect to the input images. In the example of FIG. 3, the foreground extraction unit 21 applies foreground extraction models M1 through M3 to the input images, and outputs a foreground extraction result by voting on the obtained foreground extraction results 31 through 33. The voting here is based on a majority. That is, the foreground extraction unit 21 includes each foreground included in the majority of the foreground extraction results 31 through 33 in the foreground extraction result. In an example of FIG. 3, a foreground FG1 of a triangular shape included in all of the foreground extraction results 31 to 33 and a foreground FG2 of a circular shape (a circle and an ellipse respectively) included in the foreground extraction results 31 and 32 are extracted and output to the movement trajectory feature extraction unit 22.

The movement trajectory feature extraction unit 22 extracts a movement trajectory feature which is a feature of a movement trajectory of each foreground based on the foreground extraction result. Specifically, the movement trajectory feature extraction unit 22 first calculates a center position of each foreground included in the foreground extraction result for a plurality of adjacent frames (N frames) of the input images, and tracks each foreground. Here, the center position of each foreground is calculated based on a shape of the extracted foreground. Incidentally, in a case where the center of each foreground estimated by the foreground center estimation unit 24 to be described later is a final center of the foreground, the center of the foreground calculated here is a tentative center.

Figure 4A:
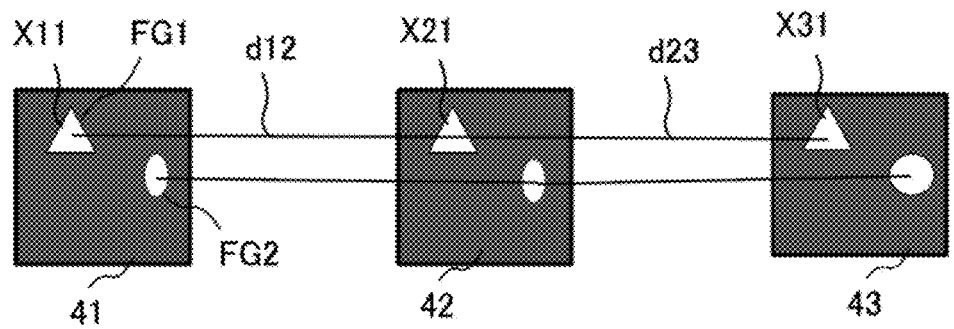
FIG. 4A and FIG. 4B are diagrams for explaining an extraction method of a movement trajectory feature and an area variation feature.

FIG. 4A is a diagram illustrating tracking of each foreground. In this example, three frames are used. The movement trajectory feature extraction unit 22 tracks the same foreground in foreground extraction results 41 through 43 obtained for a first frame through a third frame. In an example of FIG. 4A, the movement trajectory feature extraction unit 22 tracks the foreground FG1 of the triangle in each of the foreground extraction results 41 through 43, and generates correspondence relationships of the foreground FG1 among the frames. Incidentally, the movement trajectory feature extraction unit 22 also tracks the foreground FG2 of the circular shape in the same manner.

Next, the movement trajectory feature extraction unit 22 extracts the movement trajectory feature based on a tracking result of each foreground. Specifically, the movement trajectory feature extraction unit 22 acquires the coordinates of a center of each foreground in each frame and the movement amount of the center of the foreground between adjacent frames. Note that the center of each foreground here corresponds to the aforementioned tentative center. In the example of FIG. 4A, the movement trajectory feature extraction unit 22 acquires coordinates X11, X21, and X31 of the center of the foreground FG1 in each frame, movement amount d12 of the center of the foreground FG1 between the first frame and a second frame, and a movement amount d23 of the center of the foreground FG1 between the second frame and the third frame. After that, the movement trajectory feature extraction unit 22 generates the following movement trajectory feature.

Movement trajectory features: T1={X11, X21, X31, d12, d23} The movement trajectory feature extraction unit 22 similarly generates a movement trajectory feature T2 of the foreground FG2. The obtained movement trajectory feature is output to the area variation feature extraction unit 23 and the foreground center estimation unit 24.

Figure 4B:
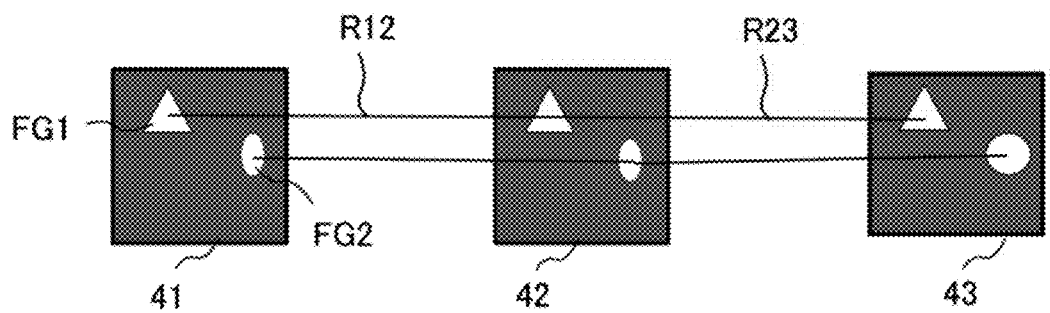

The area variation feature extraction unit 23 extracts an area variation feature using the movement trajectory feature. The area variation feature represents a temporal variation of an area of a foreground between adjacent frames. FIG. 4B is a diagram illustrating a method for extracting the area variation feature. The area variation feature extraction unit 23 calculates the area of each foreground in the foreground extraction results 41 through 43 of the first frame to the third frame, and obtains the area variation feature as follows.

Area variation feature: Area1={$R12, R23$}

Here, an "R" indicates an area variation of the foreground, and an "R12" indicates a ratio of an area in the first frame to another area in the second frame, regarding a certain foreground. For instance, when the area in the first frame of the foreground FG1 is denoted by S1, and the area in the second frame is denoted by S2, R=S1/S2 is acquired. Alternatively, R=S2/S1 may be acquired. Accordingly, the area variation feature extraction unit 23 extracts respective area variation features Area for all foregrounds included in the foreground extraction result, and outputs the extracted area variation features to the foreground center estimation unit 24.

The foreground center estimation unit 24 estimates a center of each foreground using the movement trajectory feature and the area variation feature of the foreground. Specifically, the foreground center estimation unit 24 estimates the center of each foreground using a foreground center estimation model. The foreground center estimation model is stored in the foreground center estimation model storage unit 26. The foreground center estimation unit 24 acquires the foreground center estimation model from the foreground center estimation model storage unit 26, and estimates the center of each foreground using the acquired foreground center estimation model. Incidentally, the foreground center estimation model trained in advance is stored in the foreground center estimation model storage unit 26.

Figure 5A:
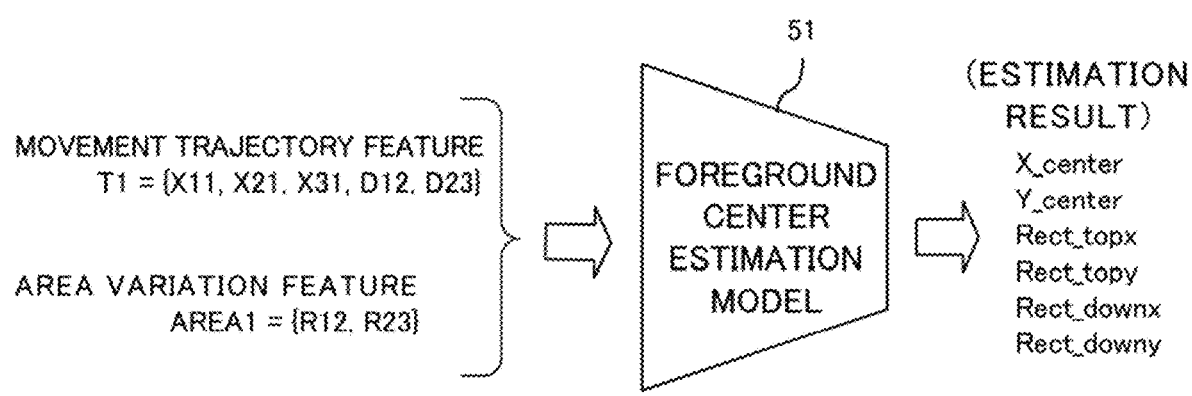
FIG. 5A and FIG. 5B illustrate examples of a configuration of a foreground center estimation unit.

FIG. 5A illustrates an example of a configuration of the foreground center estimation unit 24. As illustrated, when the foreground center estimation unit 24 estimates the center of each foreground, the movement trajectory feature T extracted by the movement trajectory feature extraction unit 22 and the area variation feature Area extracted by the area variation feature extraction unit 23 are input to a foreground center estimation model 51. As the foreground center estimation model, a regression model formed by a neural network or a SVM (Support Vector Machine) is used. The foreground center estimation model 51 estimates the center of each foreground using the input movement trajectory feature T and the area variation feature Area, and outputs coordinates of each foreground in the input images as an estimation result.

Figure 5B:
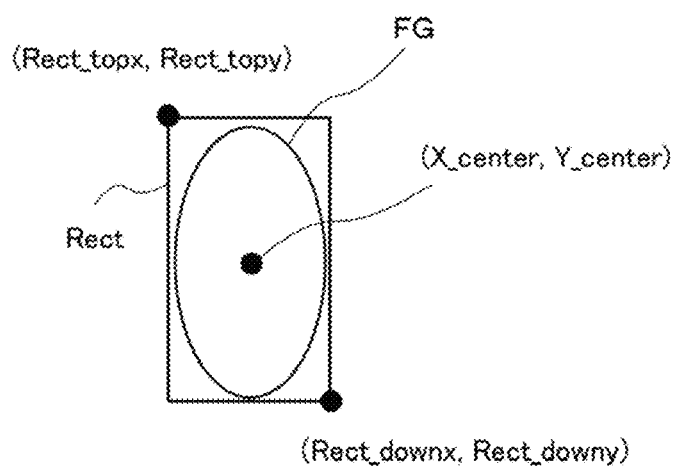

FIG. 5B shows an example of the estimation results by the foreground center estimation model. When a rectangle surrounding a foreground FG is represented by a Rect in an input image, the foreground center estimation model 51 outputs coordinates of a center of the foreground FG and coordinates of the rectangle Rect. Specifically, the coordinates of the center of the foreground FG are indicated by (X_center, Y_center). The coordinates of the rectangle Rect are indicated by coordinates (Rect_topx, Rect_topy) of an upper left point of the rectangle Rect and coordinates (Rect_downx, Rect_downy) of a lower right point. The foreground center estimation unit 24 outputs these coordinates as the estimation result.

As described above, in the present example embodiment, since the center of the foreground is estimated using the movement trajectory feature and the area variation feature of the foreground calculated based on the input images, it is possible to accurately estimate a center position of each foreground.

(Center Estimation Process)

Figure 6:
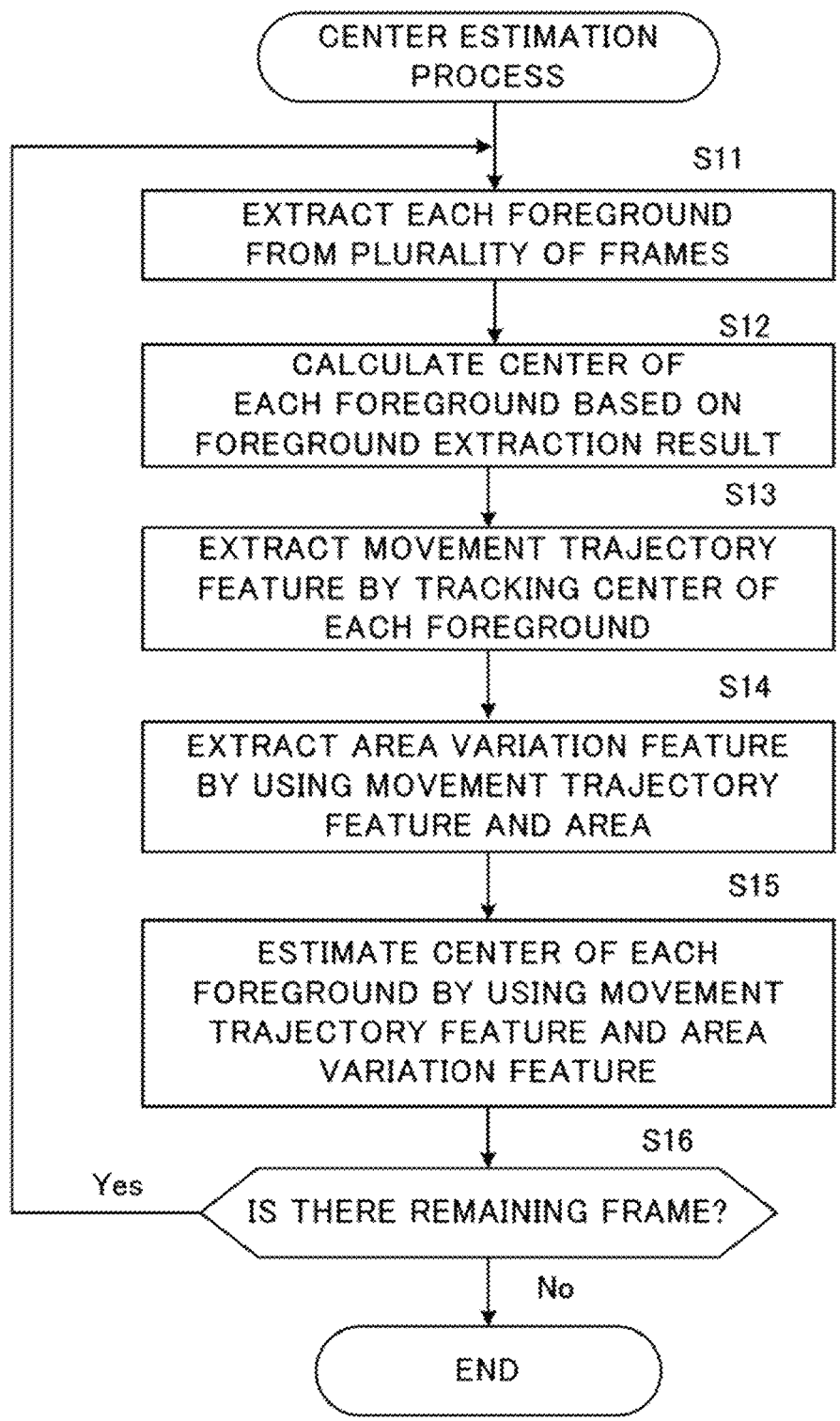
FIG. 6 is a flowchart of a center estimation process.

FIG. 6 is a flowchart of a center estimation process performed by the image processing apparatus 100. This process is realized by the processor 13 illustrated in FIG. 1, which executes a program prepared in advance and operates as each element depicted in FIG. 2.

First, the foreground extraction unit 21 extracts each foreground from a plurality of frames of input images (step S11). Specifically, the foreground extraction unit 21 acquires a plurality of foreground extraction models (N foreground extraction models) to extract foregrounds, and performs the aforementioned voting with respect to foregrounds extracted by respective foreground extraction models in order to extract each foreground. A foreground extraction result is input to the movement trajectory feature extraction unit 22.

Next, the movement trajectory feature extraction unit 22 calculates a center position of each foreground included in the foreground extraction result of N frames (step S12), tracks a center position, and extracts the movement trajectory feature T for each foreground (step S13). The extracted movement trajectory features are output to the area variation feature extraction unit 23 and the foreground center estimation unit 24. Next, the area variation feature extraction unit 23 extracts an area variation feature Area using the movement trajectory feature and the area of each foreground (step S14). The extracted area variation feature is output to the foreground center estimation unit 24. After that, the foreground center estimation unit 24 uses the foreground center estimation model to estimate the center of each foreground based on the movement trajectory feature T and the area variation feature Area, and outputs an estimation result (step S15).

Next, the image processing apparatus 100 determines whether or not there is a remaining frame in the input images (step S16). When there is the remaining frame (step S16: Yes), the process goes back to step S11, and the processes of steps S11 through S16 are performed for a next frame set. For instance, when an object identification is performed using three adjacent frames as described above, the image processing apparatus 100 first performs processes of steps S11 through S16 using the first frame to the third frame as one frame set, and then performs processes of steps S11 through S16 using the second frame to the fourth frame as one frame set by shifting one frame. On the other hand, when there is no remaining frame (step S16: No), the center estimation process is terminated.

(Learning Foreground Center Estimation Model)

Next, the learning of the foreground center estimation model is explained. In the aforementioned image processing apparatus 100, a foreground center estimation model that has already been trained is stored in the foreground center estimation model storage unit 26, and the foreground center estimation unit 24 estimates a center of each foreground using the foreground center estimation model. The learning of the foreground center estimation model will be described below.

Figure 7:
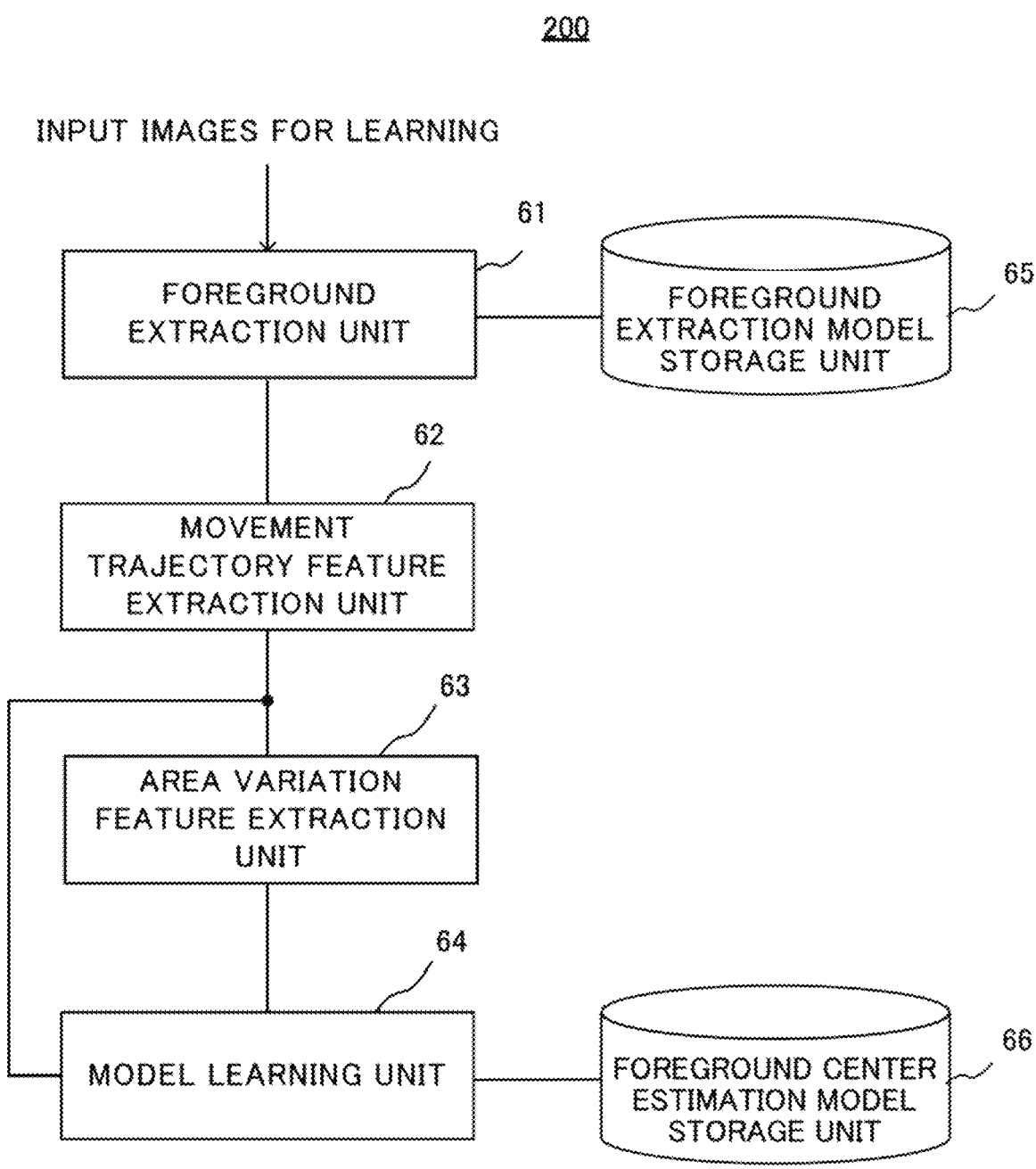
FIG. 7 illustrates a configuration of a learning apparatus for a foreground center estimation model.

FIG. 7 is a block diagram illustrating a configuration of a learning apparatus 200 for the foreground center estimation model. The learning apparatus 200 for the foreground center estimation model includes a foreground extraction unit 61, a movement trajectory feature extraction unit 62, an area variation feature extraction unit 63, a model learning unit 64, a foreground extraction model storage unit 65, and a foreground center estimation model storage unit 66. Incidentally, the foreground extraction unit 61, the movement trajectory feature extraction unit 62, the area variation feature extraction unit 63, and the foreground extraction model storage unit 65 are basically the same as the foreground extraction unit 21, the movement trajectory feature extraction unit 22, the area variation feature extraction unit 23, and the foreground extraction model storage unit 25 of the image processing apparatus 100 illustrated in FIG. 2, and operate in the same manner. Incidentally, input images for learning are input to the foreground extraction unit 61.

The foreground extraction unit 61 extracts each foreground from the input images for learning, and outputs the extracted foregrounds to the movement trajectory feature extraction unit 62. The movement trajectory feature extraction unit 62 extracts the movement trajectory feature based on the extracted foregrounds, and outputs the extracted movement trajectory feature to the area variation feature extraction unit 63 and the model learning unit 64. The area variation feature extraction unit 63 extracts an area variation feature using the movement trajectory feature and the area of each foreground, and outputs the area variation feature to the model learning unit 64.

Figure 8:
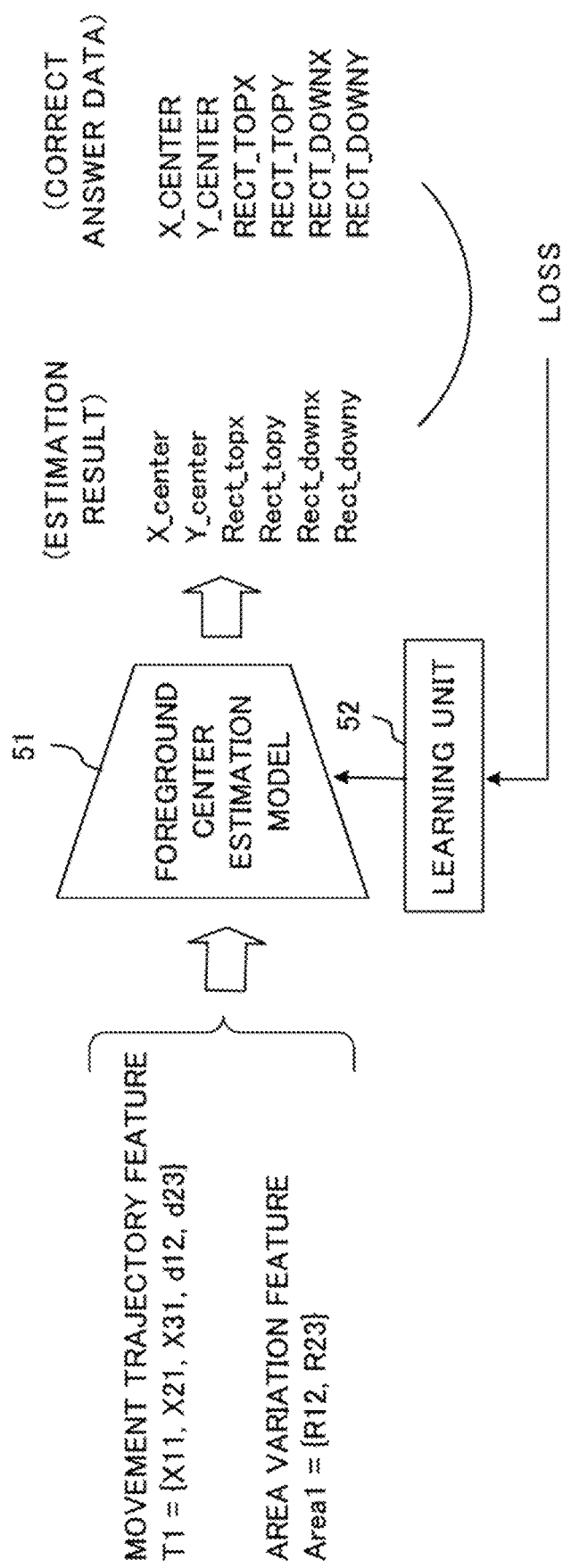
FIG. 8 illustrates examples of a configuration of a model learning unit.

The model learning unit 64 trains the foreground center estimation model. FIG. 8 is a block diagram illustrating a configuration of the model learning unit 64. The model learning unit 64 includes a foreground center estimation model 51 and a learning unit 52. Movement trajectory features and area variation features extracted from the input images for learning are input to the foreground center estimation model 51. The foreground center estimation model 51 estimates the center of the foreground using the input movement trajectory features and area variation features, and outputs an estimation result. On the other hand, correct answer data are prepared with respect to the input images for learning. As depicted in FIG. 8, the learning data are data corresponding to the estimation result, and include center coordinates of the foreground, and coordinates of an upper left point and the lower right point of a rectangle surrounding a foreground for each of foregrounds included in the input images for learning.

The learning unit 52 calculates a difference between the correct answer data and the estimation result output from the foreground center estimation model 51 for each of foregrounds, and optimizes the foreground center estimation model 51 so that a sum of calculated differences is taken as a loss and the loss is reduced. After that, the model learning unit 64 stores parameters of the foreground center estimation model 51 at a time when the learning is completed, in the foreground center estimation model storage unit 26 as the trained foreground center estimation model 51.

Figure 9:
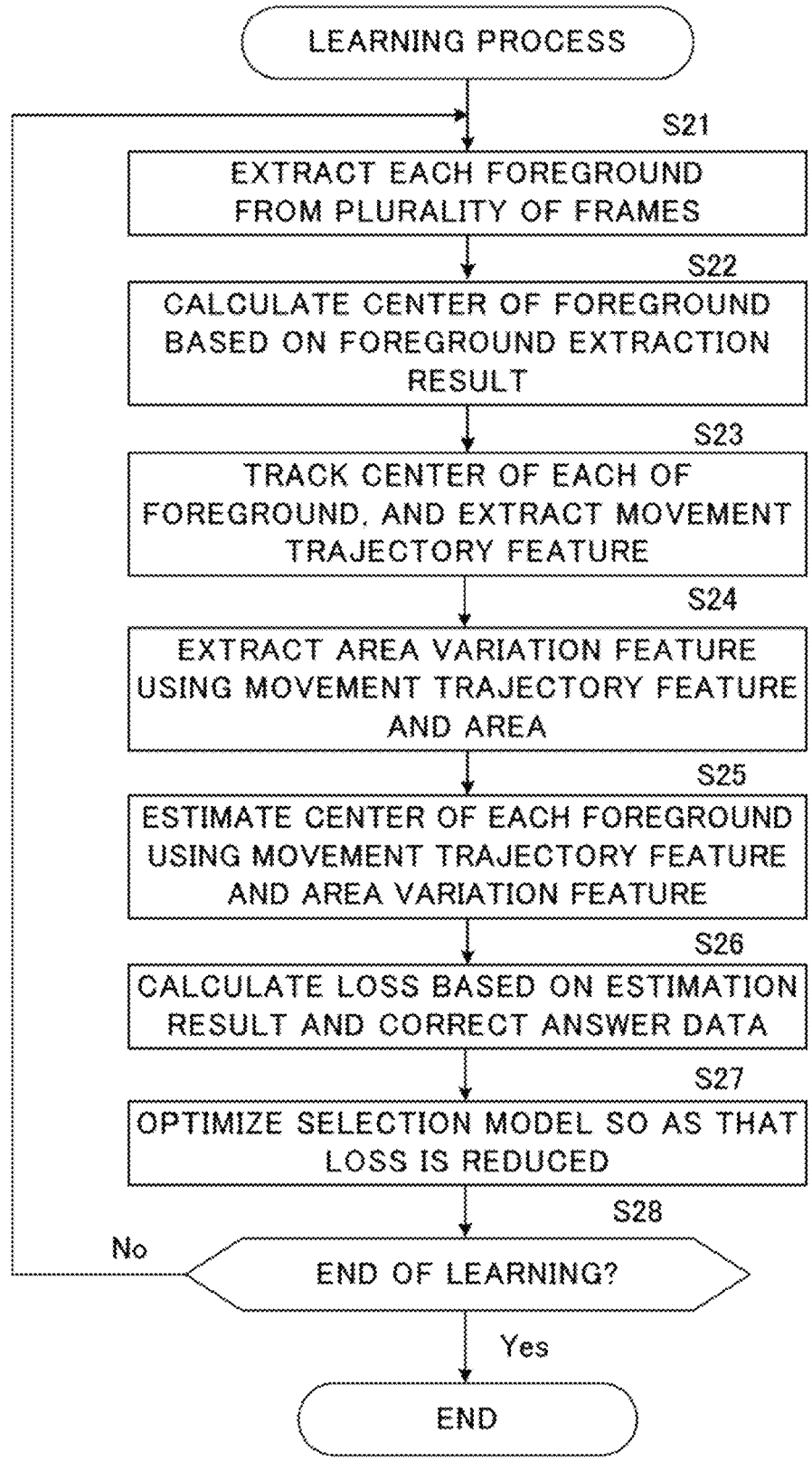
FIG. 9 is a flowchart of a learning process of the foreground center estimation model.

FIG. 9 is a flowchart of the learning process of the foreground center estimation model. This process is realized by the processor 13 illustrated in FIG. 1 executing a program prepared in advance and operating as each element depicted in FIG. 7.

First, the foreground extraction unit 61 extracts each foreground from a plurality of frames of input images (step S21). The foreground extraction result is input to the movement trajectory feature extraction unit 62. Next, the movement trajectory feature extraction unit 62 calculates a center position of each foreground included in the foreground extraction result of N frames (step S22), and tracks a foreground to extract the movement trajectory feature T of each foreground (step S23). The extracted movement trajectory features are input to the area variation feature extraction unit 63 and the model learning unit 64. Next, the area variation feature extraction unit 63 extracts the area variation feature Area using the movement trajectory feature and the area of each foreground (step S24). The extracted area variation features are input to the model learning unit 64.

The model learning unit 64 estimates a center of each foreground using the movement trajectory feature T and the area variation feature Area (step S25). Next, the model learning unit 64 calculates a loss from the correct answer data and the estimated result by the foreground center estimation model (step S26), and optimizes the foreground center estimation model so that the loss is reduced (step S27).

Next, the learning apparatus 200 for the foreground center estimation model determines whether or not the learning has been completed, that is, whether or not a predetermined end condition has been provided (step S28). Until the end condition is provided, steps S21 through S27 are repeated using the input images for learning, and when the end condition is provided (step S28: Yes), the learning process is terminated.

Second Example Embodiment

FIG. 10A is a block diagram illustrating a configuration of an image processing apparatus according to a second example embodiment. An image processing apparatus 80 includes a foreground extraction unit 81, a movement trajectory feature extraction unit 82, an area variation feature extraction unit 83, and a foreground center estimation unit 84. The foreground extraction unit 81 extracts each foreground from input images, and generates a foreground extraction result. The movement trajectory feature extraction unit 82 tracks each foreground based on the foreground extraction result, and extracts the movement trajectory feature of each foreground. The area variation feature extraction unit 83 extracts the area variation feature indicating a temporal area variation of each foreground. The foreground center estimation unit 84 estimates a center of each foreground using the movement trajectory feature and the area variation feature for the foreground.

FIG. 10B is a block diagram illustrating a configuration of a learning apparatus according to the second example embodiment. A learning apparatus 90 includes a foreground extraction unit 91, a movement trajectory feature extraction unit 92, an area variation feature extraction unit 93, and a learning unit 94. The foreground extraction unit 91 extracts each foreground from the input images, and generates a foreground extraction result. The movement trajectory feature extraction unit 92 tracks each foreground based on the foreground extraction result, and extracts the movement trajectory feature of the foreground. The area variation feature extraction unit 93 extracts an area variation feature indicating the temporal area variation of each foreground. The learning unit 94 trains a foreground center estimation model that estimates a center of each foreground using the movement trajectory feature and the area variation feature for the foreground.

A part or all of the example embodiments described above may also be described as the following supplementary notes, but not limited thereto.

(Supplementary Note 1)

1. An image processing apparatus comprising:
 a foreground extraction unit configured to extract each foreground from input images, and generate a foreground extraction result;
 a movement trajectory feature extraction unit configured to track each foreground based on the foreground extraction result, and extract a movement trajectory feature of each foreground;
 an area variation feature extraction unit configured to extract an area variation feature representing a temporal area variation of each foreground; and a foreground center estimation unit configured to estimate a center of each foreground using the movement trajectory feature and the area variation feature of the foreground.

(Supplementary Note 2)

2. The image processing apparatus according to claim 1, wherein
 the foreground extraction unit generates the foreground extraction result concerning a predetermined number of frames of the input images; and
 the movement trajectory feature extraction unit extracts a movement of a tentative center of each foreground in the predetermine number of frames of the input images as the movement trajectory feature.

(Supplementary Note 3)

3. The image processing apparatus according to claim 2, wherein the movement trajectory feature includes position coordinates of the tentative center of each foreground and a movement amount of the tentative center of each foreground between frames with respect to each of the predetermined number of frames.

(Supplementary Note 4)

4. The image processing apparatus according to any one of claims 1 through 3, wherein
 the foreground extraction unit generates the foreground extraction result with respect to the predetermined number of frames of the input images, and
 the area variation feature extraction unit extracts a ratio of variation of an area of a foreground among adjacent frames based on the movement trajectory feature and the area of each foreground.

(Supplementary Note 5)

5. The image processing apparatus according to any one of claims 1 through 4, wherein the foreground center estimation unit estimates a center of each foreground using a foreground center estimation model trained in advance.

(Supplementary Note 6)

6. The image processing apparatus according to claim 5, wherein the foreground center estimation model corresponds to a model to which the movement trajectory feature and the area variation feature are input and which outputs center coordinates of each foreground in the input images.

(Supplementary Note 7)

7. The image processing apparatus according to claim 6, wherein the foreground center estimation model corresponds to the model that further outputs position coordinates of a rectangle surrounding each foreground in the input images.

(Supplementary Note 8)

8. An image processing method comprising:
 extracting each foreground from input images, and generating a foreground extraction result;
 tracking each foreground based on the foreground extraction result, and extracting a movement trajectory feature of each foreground;
 extracting an area variation feature representing a temporal area variation of each foreground; and
 estimating a center of each foreground using the movement trajectory feature and the area variation feature of the foreground.

(Supplementary Note 9)

9. A recording medium storing a program, the program causing a computer to perform a process comprising:
 extracting each foreground from input images, and generating a foreground extraction result;
 tracking each foreground based on the foreground extraction result, and extracting a movement trajectory feature of each foreground;
 extracting an area variation feature representing a temporal area variation of each foreground; and
 estimating a center of each foreground using the movement trajectory feature and the area variation feature of the foreground.

(Supplementary Note 10)

10. A learning apparatus comprising:
a foreground extraction unit configured to extract each foreground from input images, and generate a foreground extraction result;
a movement trajectory feature extraction unit configured to track each foreground based on the foreground extraction result, and extract a movement trajectory feature of each foreground;
an area variation feature extraction unit configured to extract an area variation feature representing a temporal area variation of each foreground; and a learning unit configured to train a foreground center estimation model that estimates a center of each foreground using the movement trajectory feature and the area variation feature.

(Supplementary Note 11)

11. A learning method comprising:
extracting each foreground from input images, and generate a foreground extraction result;
tracking each foreground based on the foreground extraction result, and extracting a movement trajectory feature of each foreground;
extracting an area variation feature representing a temporal area variation of each foreground; and
training a foreground center estimation model that estimates a center of each foreground using the movement trajectory feature and the area variation feature.

(Supplementary Note 12)

12. A recording medium storing a program, the program causing a computer to perform a process comprising:
extracting each foreground from input images, and generate a foreground extraction result;
tracking each foreground based on the foreground extraction result, and extracting a movement trajectory feature of each foreground;
extracting an area variation feature representing a temporal area variation of each foreground; and
training a foreground center estimation model that estimates a center of each foreground using the movement trajectory feature and the area variation feature.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS 21, 61, 81, 91 Foreground extraction unit
22, 62, 82, 92 Movement trajectory feature extraction unit
23, 63, 83, 93 Area variation feature extraction unit
24, 84 Foreground center estimation unit
25, 65 Foreground extraction model storage unit
26, 66 Foreground center estimation model storage unit
51 Foreground center estimation model
52, 94 Learning unit
64 Model learning unit

What is claimed is:

1. An image processing apparatus comprising:
a first memory storing instructions; and
one or more first processors configured to execute the instructions to:
extract each foreground from input images, and generate a foreground extraction result;
track each foreground based on the foreground extraction result, and extract a movement trajectory feature of each foreground;
extract an area variation feature representing a temporal area variation of each foreground; and
estimate a center of each foreground using the movement trajectory feature and the area variation feature of the foreground.

2. The image processing apparatus according to claim 1, wherein
the first processor generates the foreground extraction result concerning a predetermined number of frames of the input images; and
the first processor extracts a movement of a tentative center of each foreground in the predetermine number of frames of the input images as the movement trajectory feature.

3. The image processing apparatus according to claim 2, wherein the movement trajectory feature includes position coordinates of the tentative center of each foreground and a movement amount of the tentative center of each foreground between frames with respect to each of the predetermined number of frames.

4. The image processing apparatus according to claim 1, wherein
the first processor generates the foreground extraction result with respect to the predetermined number of frames of the input images, and
the first processor extracts a ratio of variation of an area of a foreground among adjacent frames based on the movement trajectory feature and the area of each foreground.

5. The image processing apparatus according to claim 1, wherein the first processor estimates a center of each foreground using a foreground center estimation model trained in advance.

6. The image processing apparatus according to claim 5, wherein the foreground center estimation model corresponds to a model to which the movement trajectory feature and the area variation feature are input and which outputs center coordinates of each foreground in the input images.

7. The image processing apparatus according to claim 6, wherein the foreground center estimation model corresponds to the model that further outputs position coordinates of a rectangle surrounding each foreground in the input images.

8. An image processing method, comprising:
extracting each foreground from input images, and generating a foreground extraction result;
tracking each foreground based on the foreground extraction result, and extracting a movement trajectory feature of each foreground;
extracting an area variation feature representing a temporal area variation of each foreground; and
estimating a center of each foreground using the movement trajectory feature and the area variation feature of the foreground.

9. A non-transitory computer-readable recording medium storing a program, the program causing a computer to perform an image process comprising:
extracting each foreground from input images, and generating a foreground extraction result;
tracking each foreground based on the foreground extraction result, and extracting a movement trajectory feature of each foreground;
extracting an area variation feature representing a temporal area variation of each foreground; and estimating a center of each foreground using the movement trajectory feature and the area variation feature of the foreground.

10. A learning apparatus for use of the learning method according to claim 1, the image processing apparatus comprising:
   a second memory storing instructions; and
   one or more second processors configured to execute the instructions to:
      extract each foreground from input images, and generate a foreground extraction result;
      track each foreground based on the foreground extraction result, and extract a movement trajectory feature of each foreground;
      extract an area variation feature representing a temporal area variation of each foreground; and
      train a foreground center estimation model that estimates a center of each foreground using the movement trajectory feature and the area variation feature.

11. A learning method for use of the learning method according to claim 8, the image processing method comprising:
   extracting each foreground from input images, and generate a foreground extraction result;
   tracking each foreground based on the foreground extraction result, and extracting a movement trajectory feature of each foreground;
   extracting an area variation feature representing a temporal area variation of each foreground; and
   training a foreground center estimation model that estimates a center of each foreground using the movement trajectory feature and the area variation feature.

12. A non-transitory computer-readable recording medium storing a program, the program causing a computer to perform a learning process for the image process according to claim 9, the learning process comprising:
   extracting each foreground from input images, and generate a foreground extraction result;
   tracking each foreground based on the foreground extraction result, and extracting a movement trajectory feature of each foreground;
   extracting an area variation feature representing a temporal area variation of each foreground; and
   training a foreground center estimation model that estimates a center of each foreground using the movement trajectory feature and the area variation feature.

* * * * *